United States Patent [19] [11] 4,136,267
Foster et al. [45] Jan. 23, 1979

[54] TRANSMISSION SYSTEMS

[75] Inventors: Basil B. Foster; Ian J. Hirst, both of London, England

[73] Assignee: International Standard Electric Corporation, New York, N.Y.

[21] Appl. No.: 783,590

[22] Filed: Apr. 1, 1977

[30] Foreign Application Priority Data
Apr. 6, 1976 [GB] United Kingdom ............... 13863/76

[51] Int. Cl.² .......................... H04B 3/12; H04B 3/38
[52] U.S. Cl. ............................. 179/170 A; 179/170 R
[58] Field of Search ............ 179/170 R, 170 A, 170 J, 179/170 HF, 170 C, 2 A; 333/15, 16

[56] References Cited
U.S. PATENT DOCUMENTS

| 3,121,774 | 2/1964 | Parrett | 179/170 R |
| 3,804,995 | 4/1974 | Beckr | 179/170 A |
| 3,942,137 | 3/1976 | Franco et al. | 179/170 A |
| 4,017,695 | 4/1977 | Jaconetty et al. | 179/170 R |

Primary Examiner—Kathleen H. Claffy
Assistant Examiner—Randall P. Myers
Attorney, Agent, or Firm—James B. Raden; Marvin M. Chaban

[57] ABSTRACT

A repeater for a submarine cable installation which allows remote control of amplifier gain, equalizer losses and oscillator frequency. A control signal of selected frequency is transmitted to the repeater and converted to a d.c. control signal to adjust the selected component. The signal from the remote control may be in the form of pulses of a desired frequency or signals of longer duration.

9 Claims, 7 Drawing Figures

MODULATION METHOD OF CONTROL
USING TWO DIFFERENT FREQUENCY CONTROL SIGNALS

MODULATION METHOD OF CONTROL
USING PULSES OF A SINGLE CONTROL FREQUENCY

SWITCHING THE GAIN OF A REPEATER AMPLIFIER

SWITCHING THE "PULLING"
OF A CRYSTAL
OSCILLATOR

TRANSMISSION SYSTEMS

BACKGROUND OF THE INVENTION

This invention relates to telecommunications systems, particularly submarine cables systems.

Submarine telecommunications systems make great demands on component reliability since a system, once laid, is expected to have a working life in excess of 20 years. Consequently the electronic circuitry associated with the amplifiers and equalizers of such a system must be highly reliable and to this end they are manufactured under conditions of extreme cleanliness. It is important that the amplifying repeater circuitry be designed to be as uncomplicated as possible. For this reason, new electronic techniques and components are considered with extreme caution before making any changes in current practice, again with a view to maintaining high reliability.

In attempts to keep the repeater circuitry as simple as possible, the amplifiers have a fixed gain, that is to say the amplifier gain cannot be altered once the repeater casing is sealed. Provision is made for making last-minute adjustments to equalizers (passive networks) during laying the cable system to adjust for cable attenuation and to allow for predicted changes in the total system attenuation due to seasonal water temperature changes and ageing. For a better understanding of current techniques reference is directed to ITT Electrical Communication Volume 46, No. 2 1971, pages 139 to 156.

As system frequencies become higher, system gain performance may get worse so it is considered most desirable now to be able to remotely adjust some parameter of the system to effect compensation.

SUMMARY OF THE INVENTION

According to the present invention there is provided an amplifier or equalizer for a transmission link comprising frequency sensitive means for selecting a control signal sent from one end of the link, means for deriving a d.c. control signal from the selected control signal and a store able to switch from one state to another in response to the d.c. control signal to change the gain or insertion loss of the amplifier or equalizer, respectively.

In order that the invention can be clearly understood reference will now be made to the accompanying drawings described in the following description.

DETAILED DESCRIPTION OF THE DRAWINGS

Figure 1:
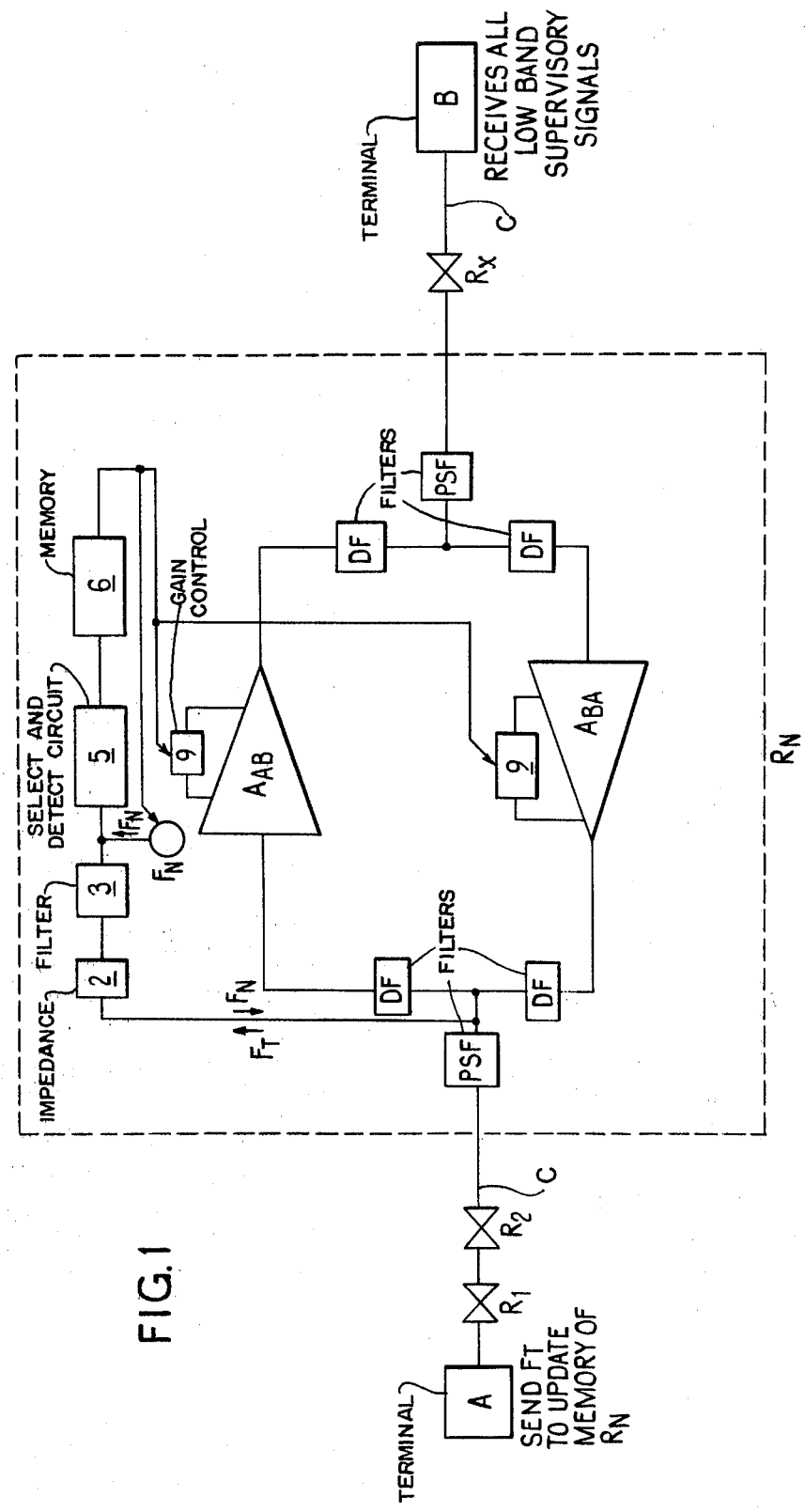
FIG. 1 is a block schematic diagram of a selection and control circuit of a repeater according to an embodiment of the invention.

Referring now to FIG. 1 a submerged telecommunications link between terminals A and B comprises a coaxial cable C with several repeaters such as $R_1$, $R_N$, etcetera, to amplify the signals. There would also be some passive equalizers but these are not shown. Each repeater contains two unidirectional amplifiers and associated directional filters, one operating in a lower band of transmission from terminal A to terminal B and the other working in the upper transmission band in the direction B to A. There could alternatively be a single amplifier and associated directional filters achieving the same result. Each repeater contains a local oscillator such as $F_N$ providing a unique very accurately controlled frequency (preferably crystal control) which lies outside the traffic bands. Oscillator $F_N$ is used for supervisory purposes to check the transmission path of the system.

The selection and control circuit shown in FIG. 1, includes the oscillator $F_N$, an isolating impedance 2 and a filter 3 for detecting a control signal $F_T$ sent from terminal A. The frequency of the control signal is such that it causes d.c. operating signal to be applied to a bistable or store. This can be done in several ways by the selection and detection circuit 5. For example as will be shown in FIG. 2, a difference beat frequency product $F_T$ minus $F_N$ can be caused to provide an audio frequency which is amplified and selected by a frequency discriminator. The discriminator selects either one of two predetermined frequencies, dependent on which of two frequencies is chosen for the control signal $F_T$ in the first place, and in this embodiment is either $700H_z$ or $900H_z$.

Figure 4:
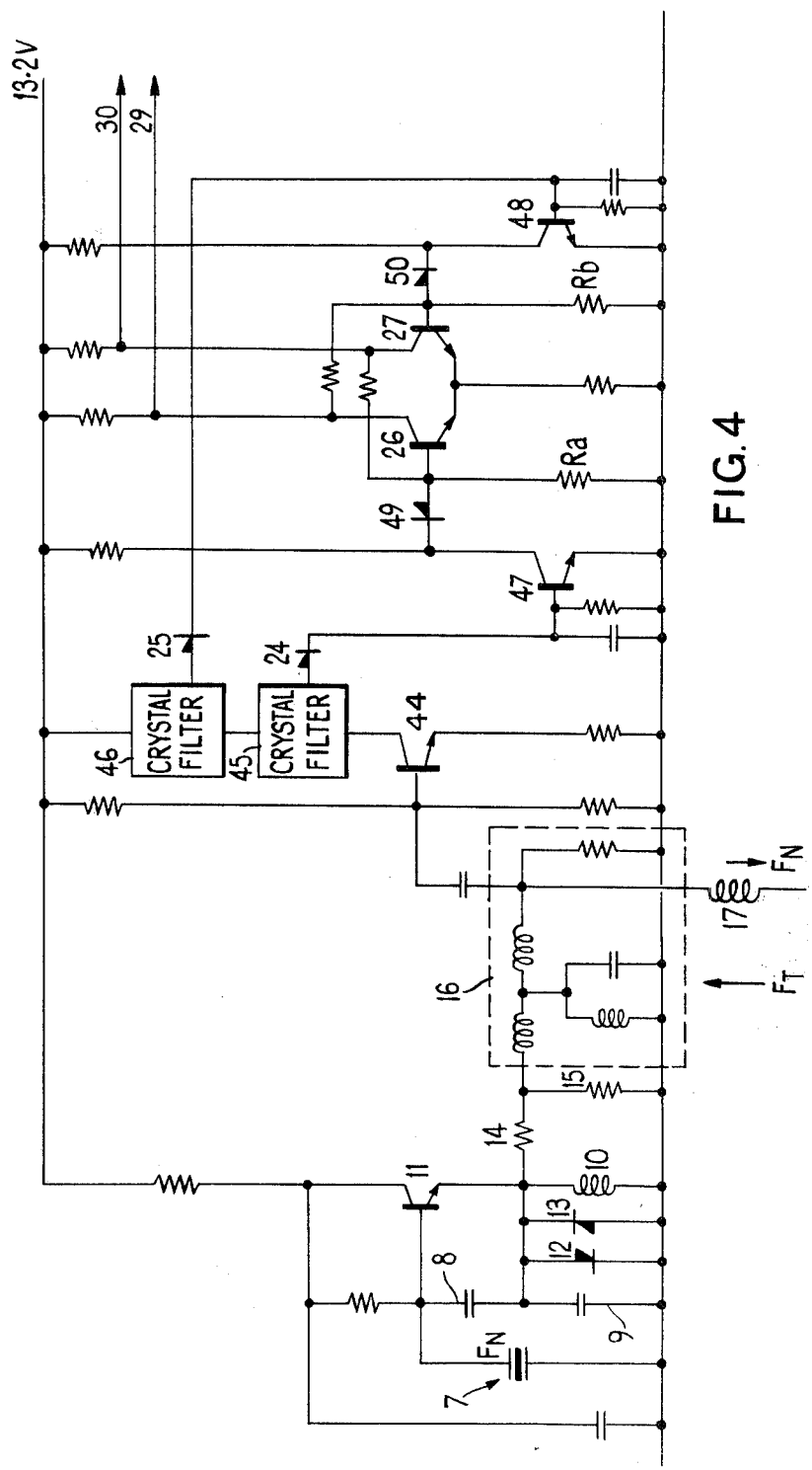

A similar result can be achieved using two crystal filters as shown in FIG. 4.

Figure 3:
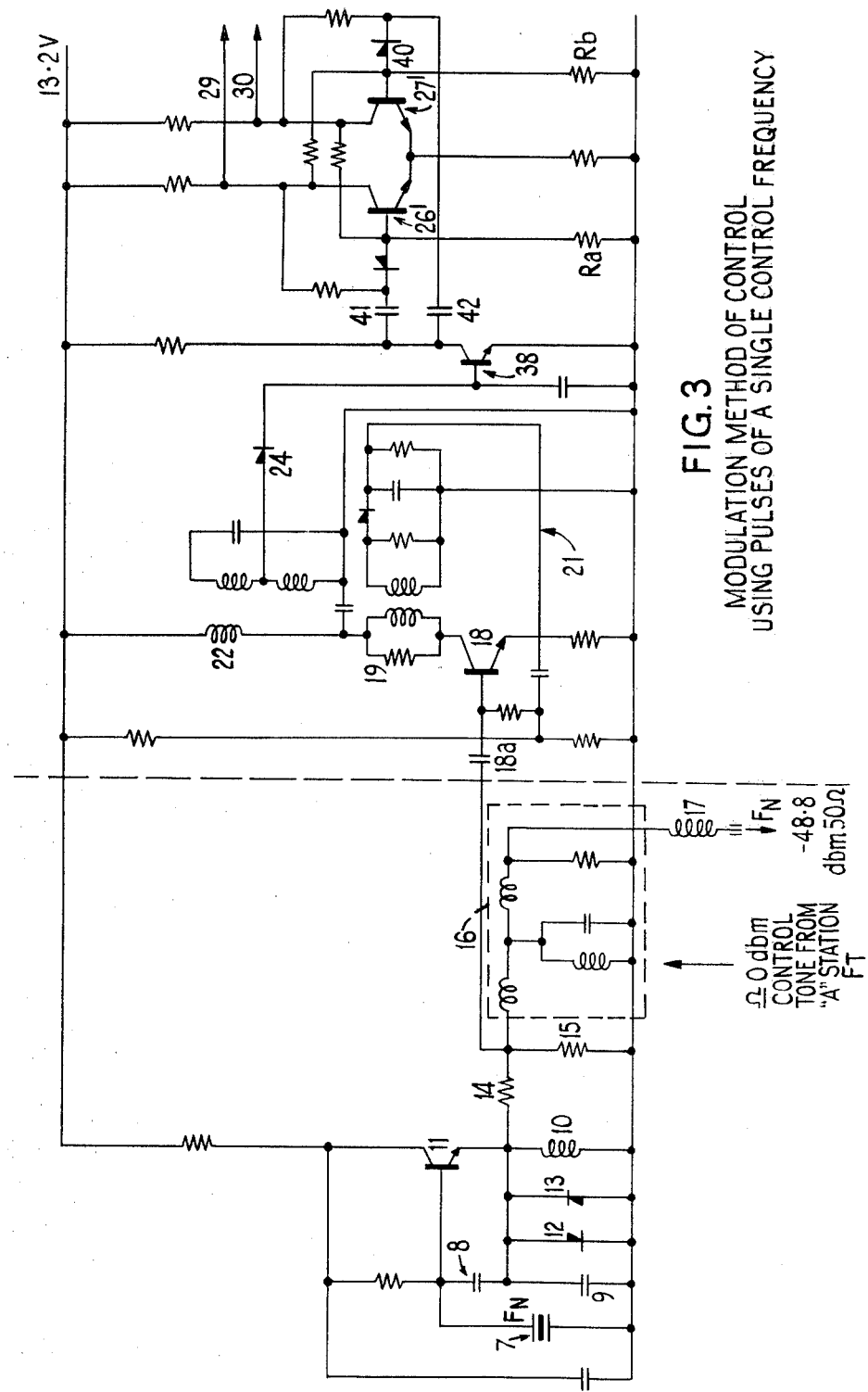
FIGS. 3, 4 and 5 are modifications of the circuit of FIG. 2.

Alternatively single frequency pulses can be used as described in FIG. 3.

The operating signal from the selection and detection circuit 5 causes the memory or store 6 to provide a d.c. bias signal to gain control circuits 9 effective to adjust the gain of both the high band and low band amplifiers, and the signal is also effective to slightly change the frequency $F_N$ of the crystal oscillator so that it is indicative of the fact that the control signal has been received and that the gain has almost certainly been changed.

The gain is changed by altering the impedance of a feedback control circuit in the amplifier as is shown in greater detail in FIG. 6 of the drawings.

Figure 2:
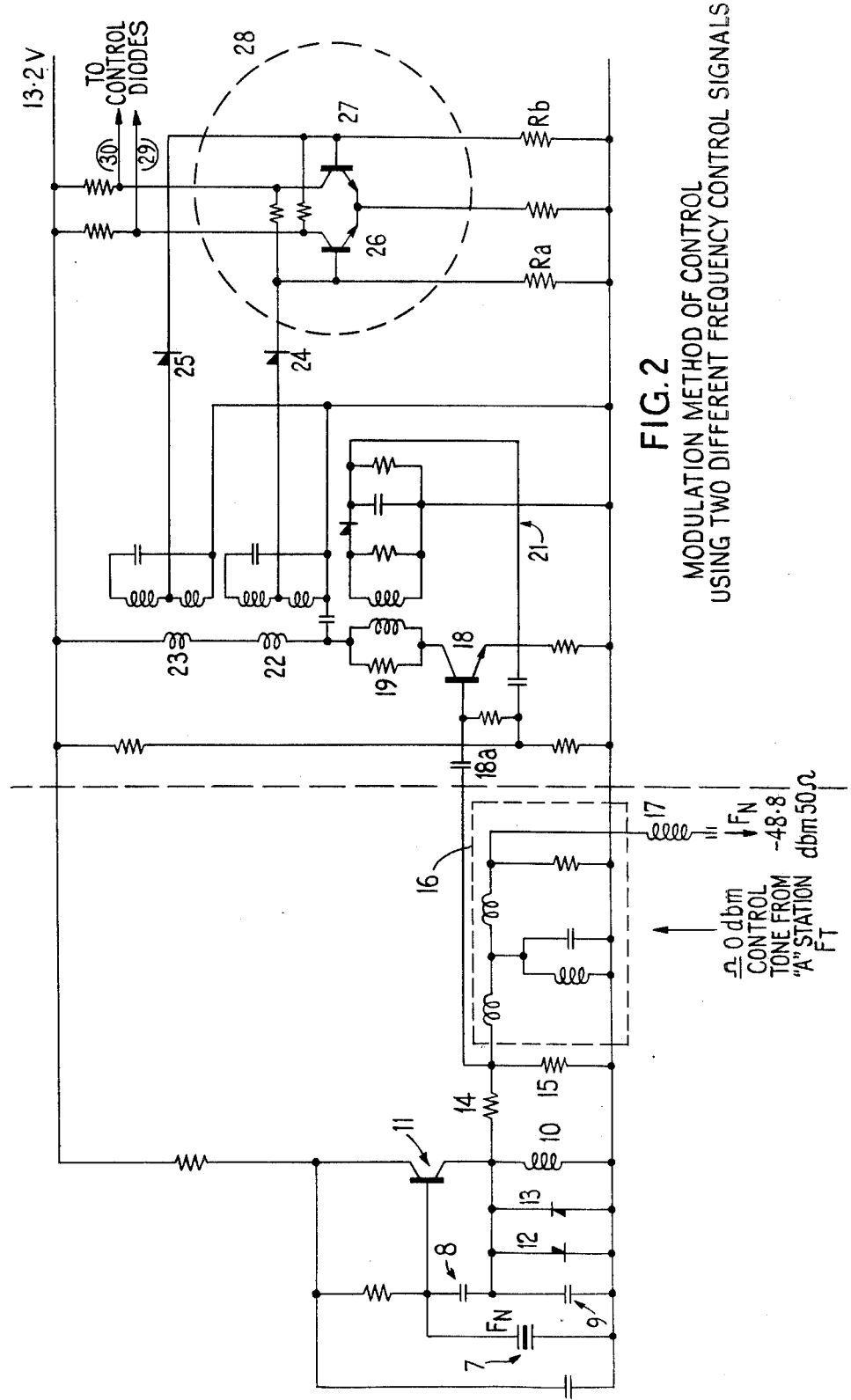
FIG. 2 is a more detailed circuit diagram of part of the block schematic of FIG. 1.

Referring now to FIGS. 2, 3 and 4 the crystal controlled oscillator $F_N$ is a Colpitts oscillator of conventional design containing a piezo-electric crystal 7, tuned circuit including capacitors 8 and 9 and inductor 10, and a transistor 11 to maintain the oscillation. Crystal diodes 12 and 13 serve to limit the output level.

The output is fed via potential divider resistors 14 and 15 through a filter network 16 of conventional design and an isolating impedance comprising an inductor 17 to the cable C via the repeater's power separating filter. The output is also fed to the base of transistor 18 via coupling capacitor 18a, this transistor 18 acting as an amplifier to amplify both signals $F_T$ and $F_N$.

The collector circuit of this transistor 18 includes a first self-resonant circuit 19 tuned with the self-capacitance of the transistor to a first high-frequency relatively broad band to embrace both the crystal frequency $F_N$ and terminal control frequency $F_T$ and the diode mixes the frequencies and passes the difference frequency back to the input of the transistor via the feedback path 21. Thus it acts using the reflex principle. This beat frequency is thus amplified by transistor 18 and has, in the embodiment of FIG. 2, either the value $700H_z$ or $900H_z$ and the particular frequency is selected by second and third resonant circuits 22 and 23 respectively.

In FIG. 2, diodes 24 and 25 detect the respective frequencies and produce the d.c. operating signal to switch on the respective transistors 26 or 27 of the memory or store 28.

Respective output terminals 29 and 30 are connected to control the impedance of the feedback path $F_P$ such as is shown in detail in FIG. 6.

Thus there has been described in FIG. 2 a remote control arrangement whereby the gain or loss of a repeater amplifier can be adjusted after the submarine cable system has been laid to compensate for significant changes in attenuation of the system. By sending a first control signal down the link for, say, repeater $R_N$ such as to produce a beat frequency of 700Hz this will change the gain of the amplifier and change the crystal oscillator frequency $F_N$ which can be detected at the end of the link. Thus it is known at the end B of the link whether the gain of repeater $R_N$ is at its higher value or at its lower value. Subsequently a second signal can be sent down the link at a different frequency to stimulate a 900Hz beat frequency to change the amplifier gain back to its original state.

Referring specifically to FIG. 3 a similar result can be achieved by using a pulse of a single frequency, one pulse to switch the bistable over and a second pulse of the same frequency to switch it back again. Thus instead of two frequencies such as 700Hz and 900Hz a single frequency can be sent as a pulse of predetermined duration and only one frequency selective circuit is necessary. This is illustrated in the modification shown in FIG. 3. Here it is assumed resonant circuit 23 is omitted and the input pulse arrives via diode 24 and is amplified by transistor 38. Assuming transistor 27' is conducting the rectified pulse is differentiated by capacitors 41 and 42 and the negative-going spike will pass through the diode 40 which is not reverse-biassed and transistor 27' switches off and the transistor 26' switches on. When the next pulse is received the reverse occurs. The outputs from terminals 29 and 30 are utilised in the same way in the embodiments of FIG. 2, FIG. 3 and FIG. 4.

Referring specifically to FIG. 4, once again the like reference numerals denote similar circuit components performing similar functions. Instead of using a modulation technique as was shown in FIG. 2, in FIG. 4 a direct control is provided using two different frequency control signals $F_T$ of the order of 1.5MHz in the present embodiments. This signal is amplified by amplifier 44 and selected by either crystal filter 45 or 46. Diode 24 or 25 again rectifies the signal which switches on a further amplifier 47 or 48. Assuming crystal filter 45 receives the signal the amplified and rectified signal from amplifier 47 will cause diode 49 to conduct and thus switch off transistor 26 to cause a d.c. control bias to appear on line 30 because transistor 27 will be switched on. A similar train of events takes place via crystal filter 46 at the appropriate frequency via diode 25, amplifier 48, diode 50 and transistor 27, causing transistor 26 to be switched on and a control bias to appear at line 29.

Figure 6A:
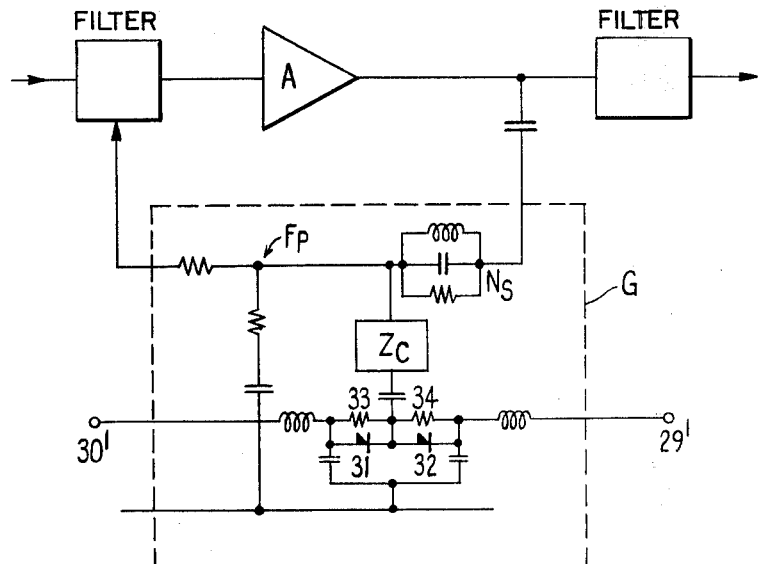
FIG. 6 (comprised of 6A & 6B) is a further circuit diagram of another part of the block schematic diagram of FIG. 1.

Referring now to FIG. 6 one of the two signal amplifiers of the repeater is shown schematically at A and has a feedback gain control circuit G. This circuit is normally factory pre-set at a desired value and includes an impedance network $Z_C$ in parallel with the feedback path $F_P$. The feedback path includes a shaping network $N_S$ to compensate for frequency dependence of the attenuation of the cable. The output terminals 29 and 30 are connected respectively to terminals 29' and 30' in FIG. 6A. If the control signal sent to the repeater has caused transistor 26 to switch on then terminals 29 and 29' will be at a lower potential than terminals 30 and 30' so that current will flow through control diodes 31 and 32 causing an effective short circuit across resistors 33 and 34 so that impedance $Z_C$ is effectively shunted across the feedback path, thus changing the effective transmission of the feedback path.

Alternatively should transistor 27 be rendered conductive then terminals 30 will be at a lower potential than terminal 29 and as a consequence diodes 31 and 32 will remain non-conductive so $Z_C$ is disconnected. Resistors 33 and 34 will not form an effective part of the parallel circuit including $Z_C$ because they have a very high value.

There would be similar gain control circuit arrangements for the other amplifier of the repeater and the terminals such as 29' and 30' of that other gain control circuit would be connected in series with the terminals 29' and 30' of the one shown in FIG. 6A. Thus terminals 29 and 30 would be connected to the series connection of the two gain control circuits.

Figure 6B:
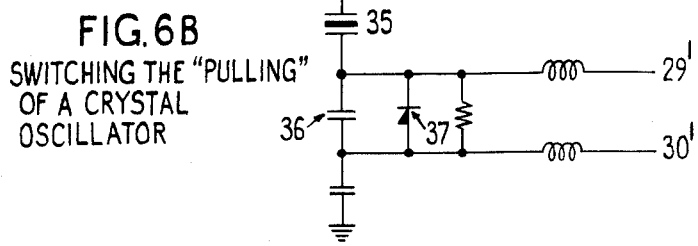

Referring now to FIG. 6B this shows a similar arrangement as applied to the crystal controlled oscillator $F_N$ and this is represented schematically by the piezo-electric crystal 35. In a manner similar to the control of the gain of the signal amplifier, the frequency of the oscillator is changed by switching in or switching out, respectively, the capacitor 36 by means of controlling the voltage across the diode 37. Once again the terminals 29 and 30 are connected with the terminal 29' and 30' of the gain control circuits of the two unidirectional amplifiers of the repeater, so that three parameters of the overall repeater can be controlled by a single signal from the memory or store 28 (FIG. 2).

It would be possible to use a transistor or a thermistor in place of the diode such as 31, 32 or 37 in order to connect or disconnect the impedance $Z_C$. Additional circuitry to control such other devices would be straightforward for those skilled in the art and will not be discussed further here.

Although not described in detail it would be equally possible for the output from the store 28 to adjust the passive network of an equaliser to thus increase or decrease the loss introduced by the equaliser. The circuit of FIG. 6A, insofar as $Z_C$ and the associated control elements connected with terminals 29' and 30', are concerned, could equally well be utilised to change the loss of an equaliser.

Figure 5:
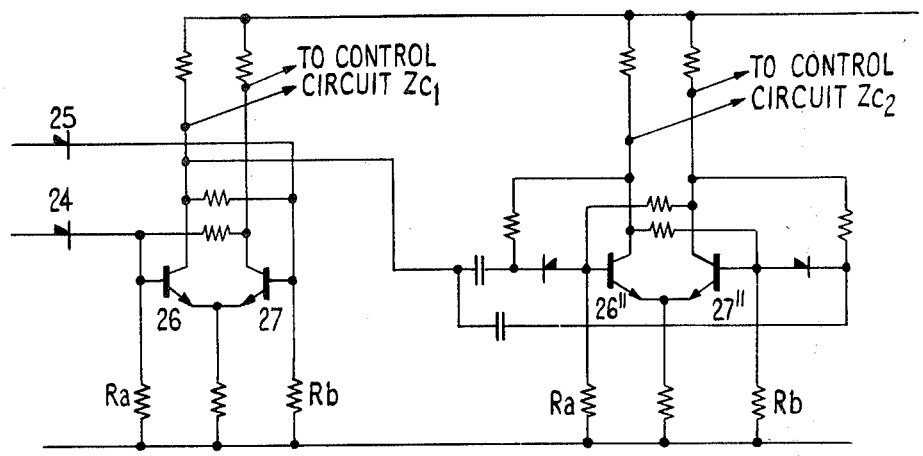

It is pointed out that the circuit of FIG. 2 could alternatively be connected with its output arranged to feed a divide-by-two store as shown in FIG. 5. Two different impedance networks can thus be switched into circuit by turning transistor 26 on several times. The following logic diagram shows the conditions pertaining in FIG. 5.

| STATE | LHS | RHS | LHS | RHS | Resulting Shunt Impedance |
|---|---|---|---|---|---|
| 1 | ON $Z_{C1}$ | OFF | ON $Z_{C2}$ | OFF | $Z_{C1}$ in parallel with $Z_{C2}$ |
| 2 | OFF OC | ON | ON $Z_{C2}$ | OFF | $Z_{C2}$ |
| 3 | On $Z_{C1}$ | OFF | OFF OC | ON | $Z_{C1}$ |
| 4 | OFF OC | ON | OFF OC | ON | OC |

NOTE: OC MEANS OPEN CIRCUIT.

If more bistable circuits are added then, divide by 2n control is achieved. Each logical state can activate a different $Z_C$ and so several control gain shapes can be accommodated.

In FIGS. 2, 3, 4 and 5 resistors Ra can be made larger in value than resistors Rb. This causes the system to come on in a known gain state when power is first applied, i.e. transistor 26 always comes on with transistor 27 off when power is first applied.

We claim:

1. Apparatus for remote control of cable repeaters, comprising within said repeater: means for detecting a control signal of predetermined frequency received by said repeater, means responsive to said control signal for translating said signal into a d.c. state-control signal, a bistable storage device having a first and a second output, said device responsive to said d.c. state-control signal for changing state to emit a condition changing signal on one of its outputs, a first circuit component of said repeater responsive to the change of state of said storage device for varying a predetermined parameter of said circuit in accordance with the output emitting the condition changing signal.

2. Apparatus according to claim 1, further comprising a generator of predetermined frequency in said repeater, said detecting means comprises frequency selective means for selecting a modulation product of the generator frequency and the received control signal for said translation.

3. Apparatus according to claim 2, wherein said frequency selective means includes means to select either one of two different frequencies for signalling over one or another output, and the storage device has separate respective inputs connected to respective outputs of the frequency selective means.

4. Apparatus according to claim 3, wherein the frequency selective means comprises two crystal filters which select two control signals of different frequencies and means in one and the other of said outputs for each separately amplifying and rectifying said control signal to produce said separate inputs to the storage device.

5. Apparatus according to claim 2, wherein the means for selecting the control signal comprises a signal-frequency selection circuit and said storage device has a single input responsive to successive d.c. state control signals of a predetermined minimum duration to successively switch from one state to the other.

6. Apparatus according to claim 2, wherein the received control signal is also effective to change the frequency of the frequency generator to indicate that the signal has been received.

7. Apparatus claimed in claim 6, in which there are two amplifiers, one operating in a high signal band and the other operating in the low signal band, and means responsive to said control signal for simultaneously changing the gain or loss in both bands.

8. Apparatus according to claim 1, comprising an impedance for the control of gain in said repeater, and a solid state switching device connected to the impedance, wherein the storage device is effective to provide a d.c. output to the switching device to change its conductive state thereof and thus connect or disconnect the impedance to thus change the gain within said repeater resulting from said impedance.

9. Apparatus according to claim 8, wherein there is an amplifier for amplifying said control signal and said impedance is connected across a negative feedback path of the amplifier.

* * * * *